United States Patent [19]
Davies et al.

[11] Patent Number: 5,596,636
[45] Date of Patent: Jan. 21, 1997

[54] TEE TIME SCHEDULING DEVICE

[76] Inventors: Peter Davies, 4820 Westgrove, Apt. 2716, Dallas, Tex. 75248; Larry T. Watson, 3306 Larkin La., Rowlett, Tex. 75088

[21] Appl. No.: 426,027

[22] Filed: Apr. 21, 1995

[51] Int. Cl.$^6$ .......................... H04M 3/42; H04M 11/00; H04M 1/00; G06F 15/00
[52] U.S. Cl. .......................... 379/216; 379/93; 379/105; 379/355
[58] Field of Search .................................. 379/93, 94, 95, 379/96, 97, 102, 103, 104, 105, 106, 107, 201, 216, 355; 364/401, 402, 407

[56] References Cited

U.S. PATENT DOCUMENTS

| | | | |
|---|---|---|---|
| 4,783,800 | 11/1988 | Levine | 379/67 |
| 4,811,234 | 3/1989 | Storace | 379/107 X |
| 4,932,021 | 6/1990 | Moody | 370/54 |
| 4,939,768 | 7/1990 | Inaba et al. | 379/58 |
| 5,029,197 | 7/1991 | Hashimoto | 379/67 |
| 5,127,044 | 6/1992 | Bonito et al. | 379/88 |

*Primary Examiner*—Jeffery Hofsass
*Assistant Examiner*—Harry S. Hong
*Attorney, Agent, or Firm*—Daniel V. Thompson

[57] ABSTRACT

A device which connects to standard telephone lines and automatically dials into, and receives information from, an automated tee time scheduling system. The device may be programed with information for a specific tee time request in advance of the day selected to play. Information stored in the unit includes day to play, particular course, time requested to play, number of players, and other information. The unit may be programmed with multiple options of the above information, each configured to suit the operation of a given golf club or group of clubs.

2 Claims, 4 Drawing Sheets

5,596,636

TEE TIME SCHEDULING DEVICE

FIELD OF THE INVENTION

This invention relates to a self-contained unit dedicated to automating and making "unattended" golf reservation tee times. The unit requires an automated tee time scheduling system at the golf course with which the unit electronically communicates.

BACKGROUND ART

Due to the popularity of the sport of golf, it is a recognized predicament whereby there are more golfers than suitable or preferred available tee times. It is common procedure at golf courses nationally and internationally that tee time reservations for a given day are allotted on a first-come first-serve basis, on a particular day and at a particular time in advance of the required reservation day. This scenario inevitably results in severe congestion at the point of reservation at the predetermined time.

Historically, tee time reservations are allotted to individuals present at the golf course, through a lottery system whereby individuals have registered in the lottery with the drawing being made at a predetermined time, by telephone call to the golf course, or a combination of each of the above, in each case the most commonly accepted and convenient method being by telephone. Subsequently, severe congestion on the telephone lines results with a bottleneck situation created through one person answering the telephone, one line at a time.

In recent years, technology has assisted in alleviating the congestion through the use of automated scheduling systems. These are effectively "smart" computer systems capable of answering multiple telephone lines and processing tee time reservation requests simultaneously, the net result being the amount of time for an individual to get through to the golf course to reserve a tee time being considerably reduced.

Practically all golf courses endure this same problem. Practically all golfers are subjected to the same frustration of experiencing busy signals when calling the course. These automated scheduling systems are gradually gaining acceptance within the golfing community. Several technology enhancements in the telephone industry have assisted in making the calls to the course easier, typically, "Automatic Call Back" and telephone number identification. Regardless, in each case, the caller must be physically at the telephone in order to process the tee time request. The "Teephone" advantage is simply that the tee time request is "unattended". The user does not physically have to be at a telephone in order to make the tee time request.

SUMMARY OF THE INVENTION

The "Teephone" is a device designed to communicate, electronically via telephone lines, to automated information or reservation systems.

Explanation of an Automated Reservation System

"Automated Information or Reservation Systems" are computers configured to be directly connected to telephone lines allowing callers to use their touch-tone telephones to communicate with the system. They are programmed to accept requests for information from callers and use voice prompts to lead a caller through a decision process to obtain specific facts or information.

An automated system allows multiple telephone lines simultaneous access to a information data base. The callers communicate with the system by depressing appropriate keys on their telephone keypad in response to voice prompts generated by the system.

The system interprets the touch tones generated by the telephone keypad and translates them into computer code for use in the software program. The caller is led through the decision process by the voice prompts. Once complete and the relevant information located, the system retrieves and verbally announces the details to the caller.

Explanation of the "Teephone"

The "Teephone" is effectively a smart modem which transmits data in ASCII to a modem at the golf course reservation system, or which generates the touch tones required by a reservation system. The unit is programmed in a particular sequence which corresponds to the required input to the automated computer system. It may also be configured to call at a specific date or time corresponding to when specific information becomes available.

The "Teephone" automatically dials the appropriate information system and via the telephone lines transmits the information to the automated system. On completion of the data transmission, the request is processed at the receiving end, and the information is digitally transmitted back to the "Teephone". The information is then displayed on the "Teephone" screen.

The unit is programmed to know what number to dial, what time to dial, what information to request, and it takes into consideration preferences when alternate choices are tendered in the decision process. This is achieved by configuring the unit to align exactly with the process and information delivered by the automated system.

"Teephone" Applications

As the unit's name suggests, its initial application is to connect to an automated golf reservation system for the purpose of reserving a golf tee time. The "Teephone" relieves the golfer of having to dial a telephone or visit the course to reserve a time, and offers an "unattended" approach to performing the task.

There are currently several automated golf reservation systems available on the market. None however, adopt this "unattended" and automated approach to communication. This makes the "Teephone" different and unique in the context of this application.

The unit, however, realizes application wherever there is a frequent requirement for making reservations, automating the process of requesting information, or duplicating a repetitive sequence where information is frequently requested. An automated system must be in place providing that information or service to which the "Teephone" can connect.

The concept eliminates the need to dial a telephone or manually perform the task and is therefore unique in that it functions "hands-free" and "unattended" when performing the dedicated task for which it is programmed.

Technical Description

The "Teephone" is an Intel 8031 micro controller base modem system. It consists of an Intel 8031 processor, associated support chips, on-board battery backup, a 16-key keypad, a two line by 20 character liquid crystal display (LCD), and a 1200 baud modem. This system is powered by a wall plug-in power supply that outputs 9 volts (DC) to the system.

The main function of the unit is to receive keyed inputs from the keypad, when prompted by the firmware, and to display this keyed information on the display. After gathering the necessary information and at the prescribed time, the unit will dial the main system and relay the stored information. After the data is sent, the "Teephone" will wait for confirmation of the given transmitted data. After receiving confirmation, the "Teephone" will display the information needed by the operator.

The ""Teephone"" senses dial tones, busy tones, and ringing on the telephone lines. The "Teephone" also has the ability to answer calls from the main system.

DETAILED DESCRIPTION

Figure 1:
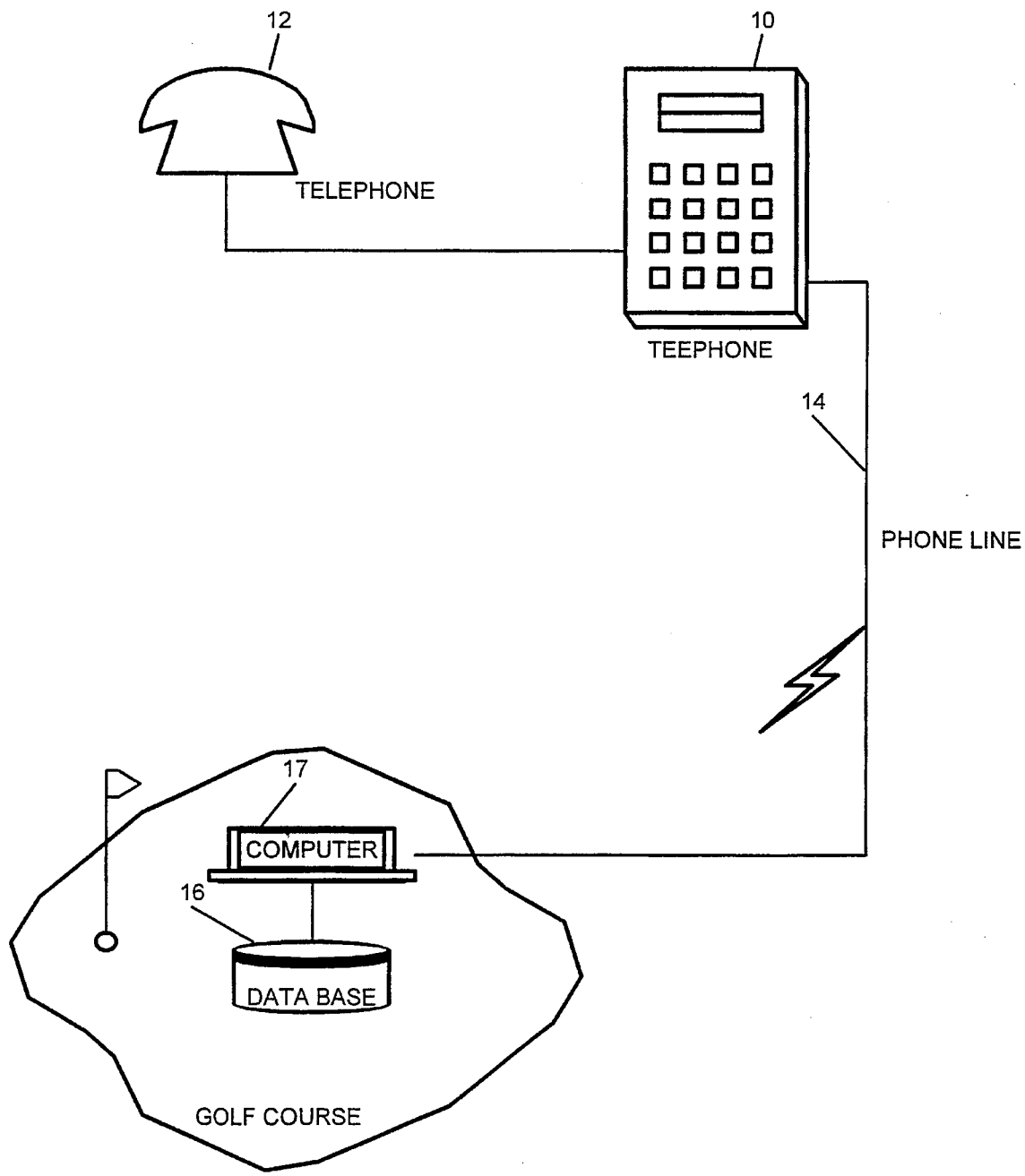
FIG. 1 is a schematic of a "Teephone" in its intended environment.

Referring initially to FIG. 1, the Teephone unit 10 is connected to a single telephone line wall outlet. A telephone 12 may be connected to the output jack of the unit 10. Normal telephone operations are not interfered with while the unit 10 is in the idle mode. Teephone unit 10 is connected via telephone line 14 to golf course host computer data base 16 via golf host computer system 17.

The unit 10 is programmed with the tee time request in accordance with the policy of the golf course. The unit 10 is programmed to "wake up" and request the stored tee time at the predetermined time corresponding to the advance reservation policy of the golf course.

While in the passive mode (inactive), the unit 10 functions as a clock. At the time to dial, several features are programmed into the unit 10 so as not to interfere with normal telephone operations. Typically, the unit 10 senses "line in use" (off hook), incoming calls, retries if a busy signal is detected at the host computer system 17, automatic retry shut-off (protects against tying up the telephone line 14 indefinitely).

After successful connection to the host computer system 17, communications are monitored, including data verification, message transfers, processing time, tee time validation, and all standard parameters of modem communication. Error traps and retry functions are integrated into the software protocol.

The primary mode of operation is standard ASCII data transfer and associated protocol. The unit 10 may also be set to operate in a "touch-tone" generating mode to simulate key strokes on a standard telephone keypad, as if an individual were responding to the voice prompts when using the "voice" component of the automated reservation system.

The unit 10 may also be preprogrammed to submit a tee time request, and receive back an allotted tee time, from a host computer system 17 operating a "lottery" allocation of tee times.

Home computers are now becoming commonplace. An alternative option offered to potential users that have a PC equipped with a modem and suitable communications software is effectively the same programming used in the Teephone, loaded on diskette.

The PC user may install the "Teephone Software Program" and use the modem to simulate the Teephone unit, but directly out of the PC. All features inherent in the Teephone are offered in the Teephone PC software.

Figure 2:
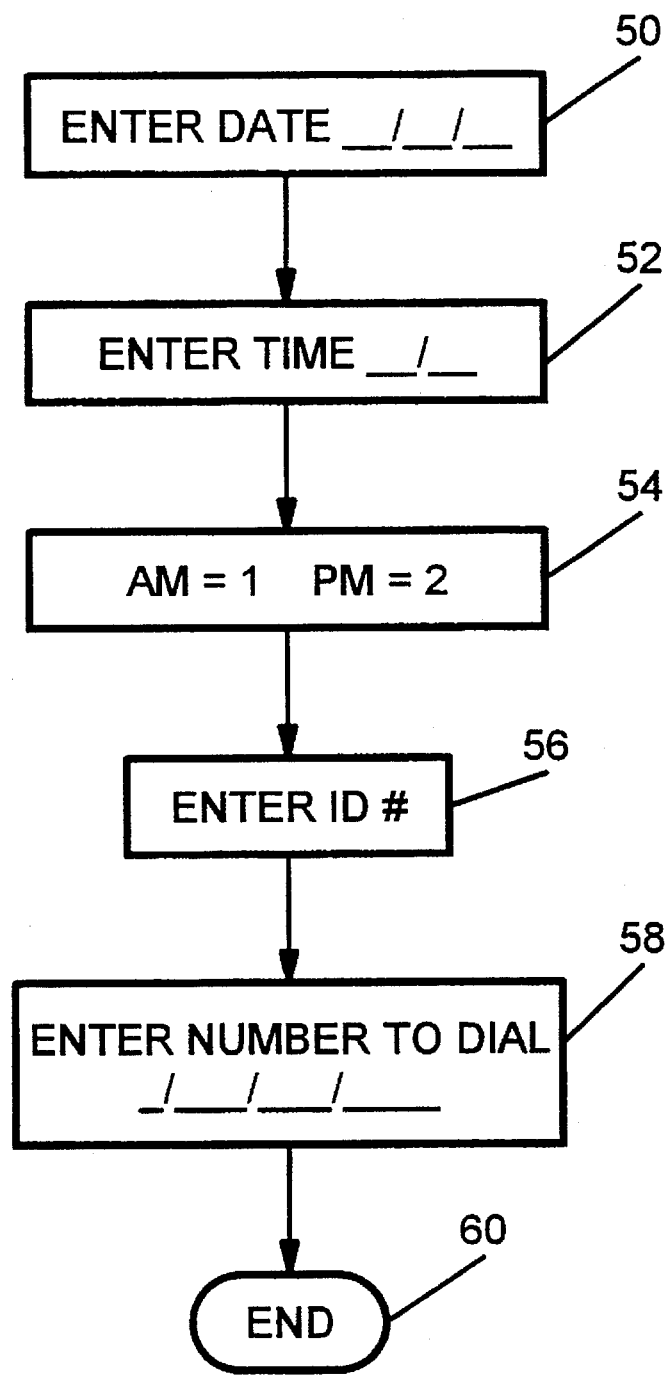
FIG. 2 is a flow chart for the installation/power-up phase of operation of a "Teephone" constructed in accordance with the invention.

Referring now to FIG. 2, the installation/power-up phase of operation begins at step 50 wherein the user is requested to enter the current date. At step 52, the time is entered, and step 54 requires the user to choose whether the time is A.M. or P.M. Step 56 enables the user to enter his unique identification number of record on the golf course system 17. Finally, step 58 permits the user to store the phone number of host computer system 17. The procedure ends at step 60.

Figure 3:
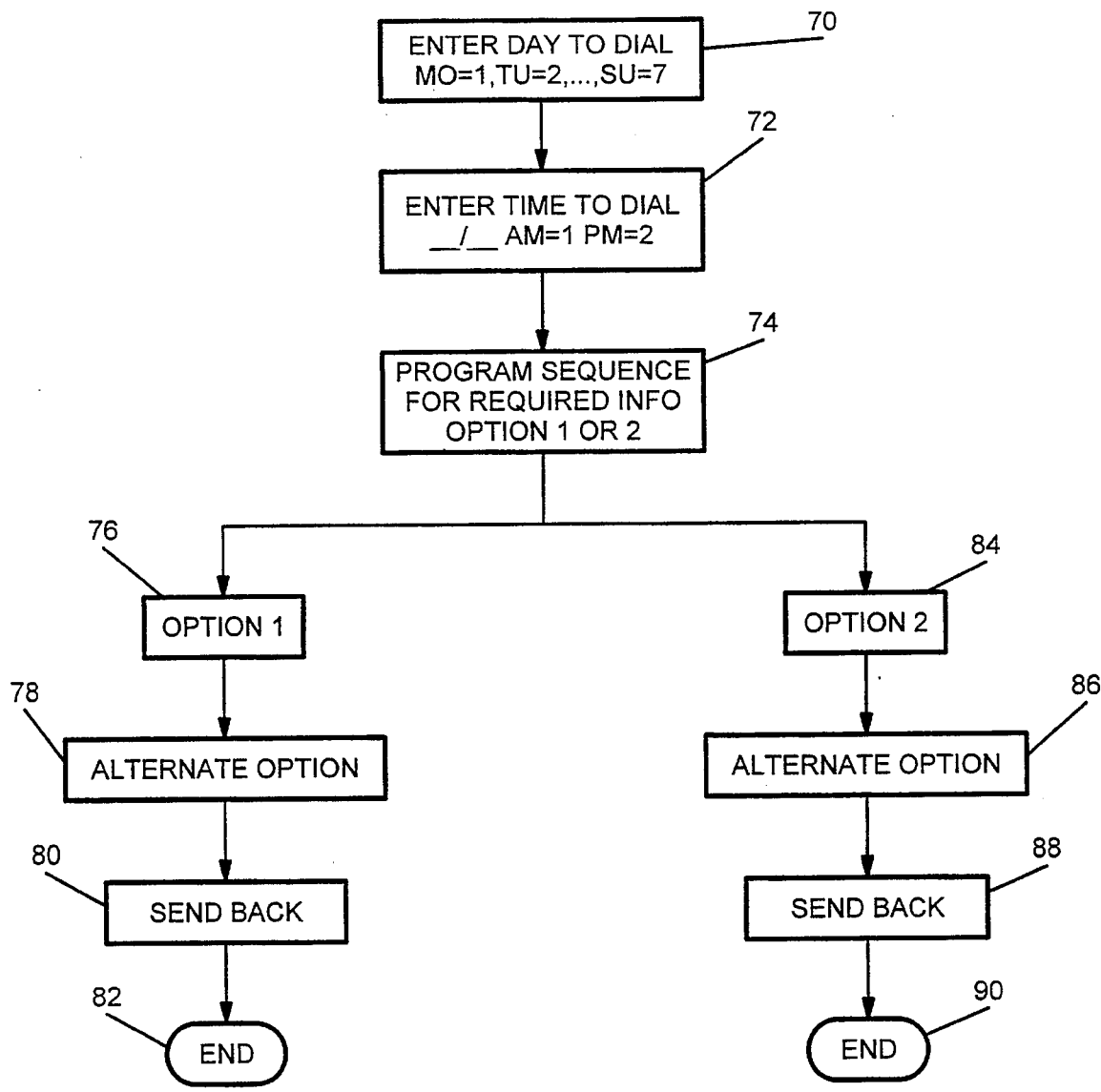
FIG. 3 is a flow chart for the reservation entry phase of operation.

FIG. 3 illustrates the program sequence for entering reservations. At step 70, the user enters the day on which the device will make its reservation entry call. In the preferred embodiment, each day of the week has a unique number, such as "1" for Monday, etc. In step 72, the user enters the exact time at which the reservation entry call will be made by the device. At step 74, the user programs the specific desired reservation information to be transmitted. Preferably, the user is permitted to enter several desired options, to be made effective depending on whether the reservation time and date are available. It is anticipated that, at busy golf courses, the available times may be limited so the ability to have alternate options transmitted to the host computer system 17 is a key feature of the device. Step 76 sends the first desired option to the system, and step 78 sends the first alternate. Step 80 receives confirmation information from host computer 17 for display to the user. Step 82 ends the procedure if either Option 1 or its alternate are accepted. Steps 84, 86, 88 and 90, steps similar to steps 76, 78, 80 and 82, are pert brined with respect to Option 2 and its alternate option.

Figure 4:
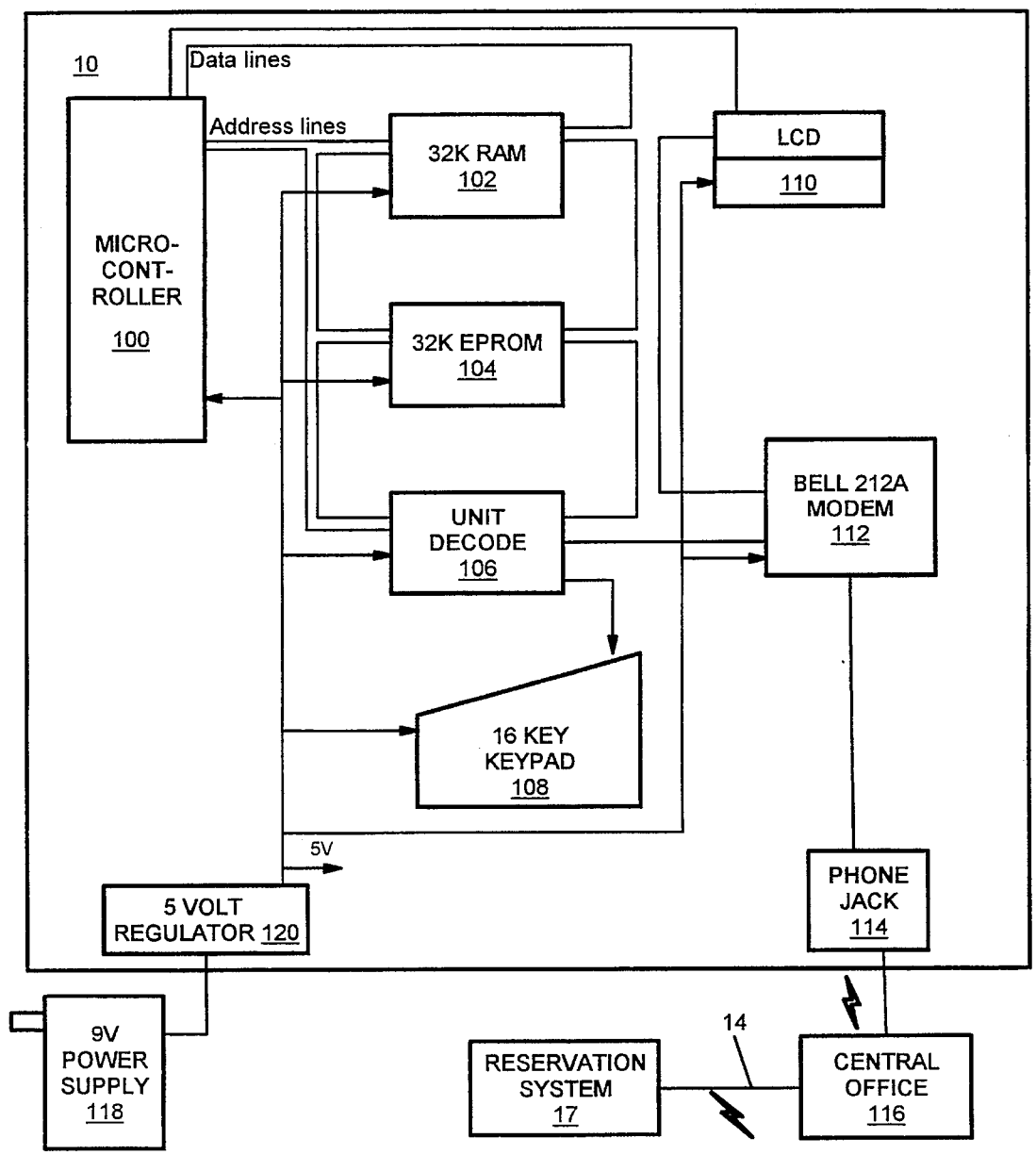
FIG. 4 is a schematic of the "Teephone" electronic reservation system, which would be installed at a user location.

Referring now to FIG. 4, the circuit of Teephone unit 10 includes a central processing unit (CPU) 100 combined with a static memory chip 102 and an eprom 104 for storing the program and the user data and the data sent back from a reservation system 17. The unit decoder 106 is used to decode addresses from the CPU 100 to determine from which device the CPU 100 is sending or receiving data.

A 16-key keypad 108 is the user means of sending data to the CPU 100, when prompted. This 16-key keypad 108 is set up as a 4 by 4 matrix and is scanned by the CPU 100 to determine when and what key has been depressed by the user.

The two line by 20 character LCD display 110 is used by the CPU 100 to convey status and to reflect user inputs to the CPU 100 from the keypad 108.

The Bell 212A modem chip 112 is used to interface the system to the telephone jack 114 onto the central exchange 116, then to the reservation system 17 via phone line 14. The modem chip 112 is responsible for going off-hook at the prescribed time, then dialing the phone number of the reservation system 17, connecting to the host reservation system 17 at the golf course, and then relaying information between the Teephone unit 10 and the reservation system 17.

In operation, this unit is supplied power by a wall plug-in power supply 118 that supplies 9 volts DC to a 5-volt regulator 120, that produces 5 volts for the unit.

The unit 10, upon power-up, does a memory test and sets its variables to a "know" state. The unit then displays on the LCD display 110 POWER LOSS, PRESS ENTER TO REGISTER. The CPU 100 then waits for the user to press the ENTER key on the keypad 108. When this is detected, the CPU 100 will then instruct the modem chip 112 to go off-hook and dial the reservation system 17 number. When the reservation system 17 answers the call, the reservation system 17 modem will connect with the modem chip 112 via the central exchange 116 and the phone jack 114. During the sequence described above, the LCD display 110 will show the different stages of progression by displaying messages to the user. These might be DIAL TONE SEARCH, DIALING, RING, CONNECT, ESTABLISH LINK, TRANSFER DATA, COMM LINK COMPLETED.

Error conditions are monitored throughout the process including, NO DIAL TONE, NO RING DETECTED, BUSY, NO ANSWER, NO SYNC TONE (carrier lost), DATA TRANSFER ERROR, TRY CONNECT AGAIN.

The unit 10 is programmed with error trapping given any of the above "fail" conditions, and is programmed to retry until successful connection with the host computer 17 is made.

Additional features protect from indefinitely tying up the telephone line 14 to which the unit 10 is connected.

Data communications between the unit 10 and the host computer 17 include host computer time, synchronizing all units to the host computer 17, operational parameters of the golf course, typically advance day and time to call for a particular reservation, number of courses, start and stop times, etc.

All information in the unit 10 is updated on each and every transaction with the host computer 17. Messages may be broadcast to all unit 10 users or to individual unit 10 users.

I claim:

1. Apparatus for automating connection to a remote reservation system comprising keypad input means for receiving user-defined reservation information, storage means for storing the reservation information while the apparatus is off line, communication means for transmitting the reservation information to the remote reservation system at a user-selected time and for receiving confirmation information back from the remote reservation system in response to the transmitted reservation information, and display means for displaying information to the user regarding acceptance of the reservation information.

2. Apparatus for automating connection to a remote reservation system comprising keypad input means for receiving user-defined first desired reservation information, storage means for storing the first desired reservation information while the apparatus is off line, communication means for transmitting the first desired reservation information to the remote reservation system at a user-selected time and for receiving confirmation information back from the remote reservation system in response to the transmitted first desired reservation information, and display means for displaying information to the user; and the keypad input means, storage means, communication means and display means being adapted to also receive store and transmit alternate reservation information, with program means for analyzing response of the reservation system to the first desired reservation information and sending the alternate reservation information if the first desired reservation information is not accepted.

* * * * *